United States Patent
Shin et al.

(10) Patent No.: US 10,226,913 B2
(45) Date of Patent: Mar. 12, 2019

(54) DECORATIVE SHEET

(71) Applicant: LG Hausys, Ltd., Seoul (KR)

(72) Inventors: Chang-Hak Shin, Seoul (KR); Hwan-Seok Park, Anyang-si (KR); Jong-Hun Lee, Seongnam-si (KR); Seong-Hoon Yue, Seongnam-si (KR); Dong-Joo Kwon, Daejeon (KR); Ku-Il Park, Yongin-si (KR); Deok-Ryul Hwang, Seoul (KR); Yea-Ri Song, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 331 days.

(21) Appl. No.: 14/910,242

(22) PCT Filed: Jul. 23, 2014

(86) PCT No.: PCT/KR2014/006675
§ 371 (c)(1),
(2) Date: Feb. 4, 2016

(87) PCT Pub. No.: WO2015/026066
PCT Pub. Date: Feb. 26, 2015

(65) Prior Publication Data
US 2016/0176167 A1    Jun. 23, 2016

(30) Foreign Application Priority Data

Aug. 19, 2013    (KR) .................. 10-2013-0097724

(51) Int. Cl.
*B32B 27/08*    (2006.01)
*B32B 27/36*    (2006.01)
(Continued)

(52) U.S. Cl.
CPC .............. *B32B 27/08* (2013.01); *B32B 27/20* (2013.01); *B32B 27/36* (2013.01);
(Continued)

(58) Field of Classification Search
CPC ......... C08L 67/00–67/08; B32B 27/00–27/42; B32B 37/00–37/30
See application file for complete search history.

(56) References Cited

U.S. PATENT DOCUMENTS

| 6,045,894 A | 4/2000 | Jonza et al. |
| 2002/0146954 A1 | 10/2002 | Drees et al. |

FOREIGN PATENT DOCUMENTS

| CN | 1228057 A | 9/1999 |
| CN | 1594430 A | 3/2005 |

(Continued)

OTHER PUBLICATIONS

Machine translation of KR20120051148. Retrieved Feb. 1, 2018.*

(Continued)

*Primary Examiner* — Prashant J Khatri
(74) *Attorney, Agent, or Firm* — Hauptman Ham, LLP

(57) ABSTRACT

Provided is a decorative sheet which comprises a top surface layer, a rear surface layer and at least one intermediate layer between the top surface layer and the rear surface layer, wherein: the top surface layer and the rear surface layer each independently are formed from a first composite resin composition comprising a glycol-modified polyethylene terephthalate resin and an ester-based resin; the intermediate layer(s) is (are) formed from a second composite resin composition comprising a glycol-modified polyethylene terephthalate resin, a polyethylene terephthalate resin and an ester-based resin; the glass-transition temperature of the ester-based resin is lower than the glass-transition temperature of the glycol-modified polyethylene terephthalate resin; the glass-transition temperature of the ester-based resin is lower than the glass-transition temperature of the polyethylene terephthalate resin; and the content of the polyethylene (Continued)

terephthalate resin in the second composite resin composition is between about 5 and about 30 wt %.

11 Claims, 6 Drawing Sheets

(51) Int. Cl.
    *B32B 27/20*         (2006.01)
    *C08L 67/02*         (2006.01)
    *A47B 96/20*        (2006.01)

(52) U.S. Cl.
    CPC ... *A47B 2096/208* (2013.01); *B32B 2250/244* (2013.01); *B32B 2250/40* (2013.01); *B32B 2255/10* (2013.01); *B32B 2255/26* (2013.01); *B32B 2270/00* (2013.01); *B32B 2307/30* (2013.01); *B32B 2307/306* (2013.01); *B32B 2307/402* (2013.01); *B32B 2307/4026* (2013.01); *B32B 2307/584* (2013.01); *B32B 2307/75* (2013.01); *B32B 2451/00* (2013.01); *C08L 67/02* (2013.01)

(56) References Cited

FOREIGN PATENT DOCUMENTS

| | | | |
|---|---|---|---|
| CN | 101898484 A | | 12/2010 |
| JP | 2006181753 A | | 7/2006 |
| KR | 200427573 Y1 | | 9/2006 |
| KR | 1020080069300 A | | 7/2008 |
| KR | 1020080086618 A | | 9/2008 |
| KR | 1020120051148 A | | 5/2012 |
| KR | 20120064497 A | * | 6/2012 |
| KR | 1020120121581 A | | 11/2012 |
| KR | 20130078581 A | * | 7/2013 |
| KR | 1020130077579 A | | 7/2013 |
| KR | 1020130078581 A | | 7/2013 |
| WO | 2008/091067 A1 | | 7/2008 |
| WO | 2012148099 A2 | | 11/2012 |

OTHER PUBLICATIONS

Machine translation of KR20120064497. Retrieved Feb. 1, 2018.*
Machine translation of KR20130078581. Retrieved Feb. 1, 2018.*
Papadopoulou et al. "Compatibility behaviour of blends of poly(ethylene terephthalate) with an amorphous copolyester". Polymer, vol. 38, No. 3, (1997); pp. 631-637.*
Papadopoulou et al. "Blends of an amorphous copolyester with poly(butylene terephthalate)". European Polymer Journal, vol. 33, No. 2, (1997); pp. 191-197.*
Avramova, N. "Amorphous poly(ethylene terephthalate)/poly(butylene terephthalate) blends: miscibility and properties". Polymer, vol. 36, No. 4, (1995); pp. 801-808.*
Stein et al. "X-Ray and Optical Studies of the Morphology of Polymer Blends". Journal of Polymer Science: Polymer Symposium 63, (1978); pp. 313-328.*
Escala et al. "Crystallization Studies of Blends of Polyethylene Terephthalate and Polybutylene Terephthalate". Multiphase Polymers (eds. Cooper and Estes), Chapter 24, (1979); pp. 455-487.*
Korean Office Action dated Mar. 29, 2017 in connection with the counterpart Korean Patent Application No. 10-2013-0097724, citing the above reference(s).
Extended European Search Report dated Jul. 14, 2016 in connection with the counterpart European Patent Application No. 148371263-1303, citing the above reference(s).
ntemational Search Report dated Oct. 28, 2014 corresponding to International Application No. PCT/KR2014/006675, citing the above reference(s).
Korean Office Action dated Jan. 9, 2018 in connection with the counterpart Korean Patent Application No. 10-2013-0097724, citing the above references.
Chinese Office Action dated Oct. 24, 2018 for corresponding Chinese Application No. 201480045562.6.

* cited by examiner

DECORATIVE SHEET

TECHNICAL FIELD

The present invention relates to an environmentally friendly decorative sheet which has excellent moldability and can be manufactured economically.

BACKGROUND ART

Coatings or decorative sheets are mainly used as decorating materials for furniture, sinks, doors, and the like.

For coating materials an UV-curing high gloss paint has been used, but it can realize only a single color and has the problem of yellowing after painting and lowering of gloss as time passed.

Conventionally, polyvinyl chloride (PVC) sheets have been used as decorative sheets. With various advantages such as low price, excellent processability, thermal deformability, excellent elongation, and the like, PVC sheets have been widely used for a variety of products.

However, PVC sheets have a problem of generating a large amount of dioxin upon burning. Dioxin is a typical endocrine disruptor that is extremely stable and resistant to decomposition. Thus, once absorbed into the human body, dioxin is not easily discharged from the body and accumulates therein. As a result, dioxin can cause cancer, severe reproductive system disorders, developmental disorders, and the like. Moreover, dioxin can damage the endocrine system.

Due to harmfulness of polyvinyl chloride on the human body, regulations concerning polyvinyl chloride-based products are being strengthened.

In recent years, to replace polyvinyl chloride, environmentally friendly materials have been developed, and polyesters-based sheets, i.e., polyethylene terephthalate (PET) sheets are proposed.

PET sheets have a high quality surface, while they require a higher molding temperature and a narrower molding temperature range than a PVC sheet. Therefore, PET sheets have the problem that they do not have good moldability. Moreover, PET sheets have limitations in coating for improving hardness and cause a high rate of defects due to crystallization.

Further, when PET sheets employ a large amount of additives for the purpose of improving moldability, it is difficult for securing a uniform printability.

To remedy such disadvantages the PET sheets, PETG sheets are proposed. PETG, an amorphous polymer, does not cause defects due to crystallization and is easily coated on surfaces, thereby being useful for decorative sheets. However, PETG has the disadvantage that its cost is higher than PET by about 30%.

Moreover, decorative sheets for indoor use require a surface hardness since they are exposed to frequent scratches.

In order to give a scratch resistance, decorative sheets are coated with hard coating layer on the top surface layer.

DISCLOSURE

Technical Problem

It is an aspect of the present invention to provide a decorative sheet which has a low and wide range of moldable temperature, a moldability even onto a severely curved surface without whitening, and a high scratch-resistance even for a long period of indoor use.

Technical Solution

In accordance with one aspect of the present invention, there is provided a decorative sheet comprising a top surface layer, a rear surface layer and at least one intermediate layer between the top surface layer and the rear surface layer, wherein the top surface layer and the rear surface layer each independently are formed from a first composite resin composition comprising a glycol-modified polyethylene terephthalate resin, or a blend of a glycol-modified polyethylene terephthalate resin and an ester-based resin; the intermediate layers is formed from a second composite resin composition comprising a glycol-modified polyethylene terephthalate resin, a polyethylene terephthalate resin and an ester-based resin; the glass-transition temperature of the ester-based resin is lower than the glass-transition temperature of the glycol-modified polyethylene terephthalate resin; the glass-transition temperature of the ester-based resin is lower than the glass-transition temperature of the polyethylene terephthalate resin; and the content of the polyethylene terephthalate resin in the second composite resin composition is about 5 to about 30 wt %.

The ester-based resin may comprise at least one selected from the group consisting of polybutylene terephthalate, polytrimethylene terephthalate, and a combination thereof.

The content of the ester-based resin in the first composite resin composition may be about 0 to about 20 wt %.

The content of the ester-based resin in the second composite resin composition may be about 3 to about 30 wt %.

The first composite resin composition and the second composite resin composition each may have a glass-transition temperature (Tg) of about 72±10° C.

The decorative sheet may further comprise a pigment in at least one of the layers of the sheet.

The content of the pigment in the first composite resin composition or the second composite resin composition may be about 0.1 to about 30 wt %.

The intermediate layer may have a thickness of about 1 to about 20 times the thickness of the top surface layer.

The rear layer may have a thickness of about 1 to about 2 times the thickness of the top surface layer.

The decorative sheet may have the total thickness of about 200 μm to about 1000 μm.

The decorative sheet may have a moldable temperature of about 55° C. to about 80° C.

The decorative sheet may further comprise a hard coating layer on the top surface layer.

The hard coating layer may comprise at least one selected from the group consisting of methyl methacrylate, hydroxyethyl methacrylate, methacrylate, ethyl acrylate, and a combination thereof.

Advantageous Effects

The decorative sheet is environmentally friendly and has an excellent printability, a low and wide range of moldable temperature, and a moldability even onto a severely curved surface without whitening. Further, the decorative sheet exhibits no lifting or delamination between the decorative sheet and a hard coating layer, thereby providing a high surface hardness.

BEST MODE

Figure 1:
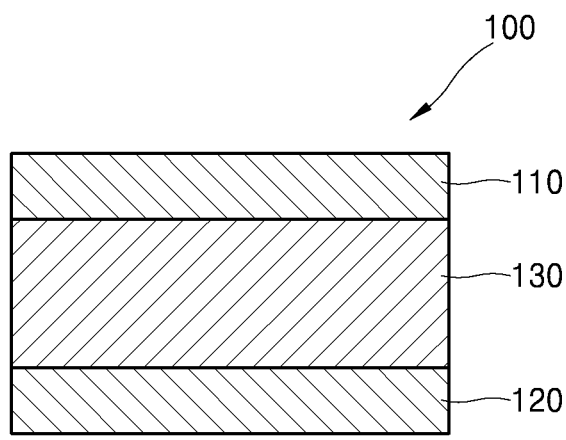
FIG. 1 is a sectional view of a decorative sheet according to one embodiment of the present invention.

Hereinafter, exemplary embodiments of the present disclosure will be described in detail. However, exemplary embodiments are merely illustrative but not limiting. It is to be noted that the scope of the present disclosure is defined only by the claims.

Well-known elements have been omitted in order not to unnecessarily obscure the gist of the present disclosure. Like reference numerals designate like elements throughout the specification.

In the drawings, the thickness of layers, regions, etc., are enlarged for the sake of clarity. In addition, in the drawings, the thickness of some layers, regions, etc., are shown as being exaggerated for convenience of illustration.

It will be understood that when an element such as a layer, region, substrate, or panel is referred to as being "on" or "under" another element, it can be directly on or under the other element or intervening elements may also be present.

In an embodiment of the present invention, a decorative sheet comprising a top surface layer, a rear surface layer and at least one intermediate layer between the top surface layer and the rear surface layer, wherein the top surface layer and the rear surface layer each independently are formed from a first composite resin composition comprising a glycol-modified polyethylene terephthalate (PETG) resin or an ester-based resin; the intermediate layers is formed from a second composite resin composition comprising a glycol-modified polyethylene terephthalate (PETG) resin, a polyethylene terephthalate (PET) resin and an ester-based resin; the glass-transition temperature of the ester-based resin is lower than the glass-transition temperature of the glycol-modified polyethylene terephthalate (PETG) resin; the glass-transition temperature of the ester-based resin is lower than the glass-transition temperature of the polyethylene terephthalate (PET) resin; and the content of the polyethylene terephthalate (PET) resin in the second composite resin composition is about 5 to about 30 wt %.

The decorative sheet does not generate endocrine disruptors and thus are more environmentally friendly than PVC sheets, and employ a resin having excellent printability such as PETG, and the like, thereby enabling realization of various decorative patterns.

In addition, the decorative sheet has a low and wide range of moldable temperature and a moldability even onto a severely curved surface without whitening, thereby being applicable to various moldings including overlay molding, membrane molding, wrapping molding and high glossy molding.

Further, the decorative sheet has a high scratch-resistance even for a long period of indoor use, and when a hard coating layer is further laminated on the decorative sheet, there is no lifting or delamination between the decorative sheet and the hard coating layer, thereby providing a high surface hardness.

When a decorative sheet is made from a PETG resin and an ester-based resin only (where the glass transition temperature of the ester-based resin is lower than the glass transition temperature of the PETG resin), it requires relatively high manufacturing costs. However, the decorative sheet whose intermediate layer partially contains PET can be manufactured economically as well as it has no difficult in molding on curved surfaces and can be molded at a low temperature.

FIG. 1 is a schematic sectional view of a decorative sheet 100 according to one embodiment of the present invention.

In FIG. 1, the decorative sheet 100 includes a top surface layer 110 and a rear surface layer 120, and includes an intermediate layer 130 placed between the top surface layer 110 and the rear surface layer 120. The intermediate layer 130 is illustrated in a single layer in FIG. 1, but the decorative sheet 100 may comprise several intermediate layers.

As mentioned above, the first composite resin composition used for the top surface layer 110 and the rear surface layer 120 comprises a polyethylene terephthalate glycol (PETG) resin and an ester-based resin, and the second composite resin composition used for the intermediate layer 130 comprises a glycol-modified PETG resin, a polyethylene terephthalate (PET) resin and an ester-based resin.

In the PETG resin, the PET resin and the ester-based resin used in the decorative sheet 100, the glass transition temperature (Tg) of the ester-based resin should be lower than the glass transition temperature (Tg) of the glycol-modified polyethylene terephthalate resin, and the glass transition temperature (Tg) of the ester-based resin should be lower than the glass transition temperature (Tg) of the polyethylene terephthalate resin.

The PETG resin is an amorphous polymer, which does not entail whitening on curved surfaces upon molding through a membrane process. The PETG resin may include commercially available SKYGREEN from SK Chemicals Co., Ltd., Spectar from Eastman Chemical Company, Eastar from Eastman Chemical Company, and the like.

However, since PETG has a relatively high glass transition temperature (Tg) of about 80° C., a PETG sheet requires a high molding temperature.

The ester-based resin can reduce the glass transition temperature (Tg) and the moldable temperature of the PETG resin, and for this purpose, an ester-based resin having a glass transition temperature lower than that of the PETG resin may be used. In other words, the ester-based resin used in the present invention satisfies $Tg\_C < Tg\_A$ and $Tg\_C < Tg\_B$, where $Tg\_A$, $Tg\_B$ and $Tg\_C$ are glass transition temperatures of the PETG resin, the PET resin, and the ester-based resin, respectively.

The ester-based resin may include polybutylene terephthalate (PBT) resin, polytrimethylene terephthalate (PTT) resin, and a combination thereof. For example, the PBT resin may be prepared by liquid phase polymerization or solid-state polymerization.

The content of the ester-based resin in the first composite resin composition may be about 0 wt % to about 20 wt %, specifically, about 0 wt % to about 7 wt %, more specifically about 0 wt % to about 4 wt %.

The content of the ester-based resin in the second composite resin composition may be about 3 wt % to about 30 wt %, specifically, about 5 wt % to about 20 wt %.

When the content of the ester-based resin in the first composite resin composition or the second composite resin composition is less than the above range, the degree of lowering the glass transition temperature (Tg) and the moldable temperature of the whole resin can become insignificant. On the contrary, when the content is more than the above range, the sheet can suffer from roughness deepening after thermal molding.

The first composite resin composition or the second composite resin composition, which comprises the ester-based resin in the above amounts, may have a glass transition temperature (Tg) of about 72±10° C. Specifically, they may have a glass transition temperature (Tg) of about 68±3° C., in which a glass transition temperature of a PETG resin is reduced by about 12° C. after blending, since a PETG resin has a glass transition temperature of about 80° C.

Accordingly, a decorative sheet 100 according to an embodiment of the present invention, unlike PVC, does not generate endocrine disruptors while has a similar molding temperature and moldability to PVC.

Since the decorative sheet 100 comprises layers formed from the first composite resin composition and the second composite resin composition having a glass transition temperature of the above range, a storage modulus can be improved, and a moldable temperature may range from about 55 to about 80° C.

A PET resin, a crystalline polymer, is comprised in the second composite resin composition, which is used for the intermediate layer.

Further, the decorative sheet 100 can be molded even onto a severely curved surface without whitening, thereby being applicable to various moldings including overlay molding, membrane molding, wrapping molding and high glossy molding.

Since a PET resin is cheaper than a PETG resin, a large amount of a PET resin may be used in the decorative sheet 100 to reduce manufacturing costs.

As mentioned above, the second composite resin composition used for the intermediate layer 130 comprises about 5 wt % to about 30 wt % of a PET resin based on its total weight. When the content of the PET resin in the second composite resin composition used for the intermediate layer 130 is more than the above range, moldability on curved surfaces can deteriorate and cracks or whitening can be occurred in curved part of molding. When the content of the PET resin is less than the above range, reduction in the total manufacturing costs by using relatively cheap resins cannot be satisfactorily attained.

Since the decorative sheet 100 comprises a large amount of PET resin for the economic purpose, consists of at least three layers, and does not comprises a PET resin in the top surface layer 110 and the rear surface layer 120, it is economical as well as fulfills moldability on curved surface, surface property and coating stability.

By comprising no PET resins in the top surface layer and the rear surface layer, lifting of the hard coating layer can be prevented.

Meanwhile, the top surface layer and the rear surface layer comprise a PETG resin, which is environmentally friendly and has an excellent printability, instead of PET resins so that the decorative sheet 100 fulfills such properties as well as can be molded even onto a severely curved surface without whitening.

As described above, the decorative sheet 100 has advantages in that it can be molded even onto a severely curved surface, has a high scratch-resistance and can be manufactured economically. Further, the decorative sheet does not generate endocrine disruptors and is environmentally friendly since it may not employ a polyvinyl chloride (PVC) resin.

The first composite resin composition and the second composite resin composition may further comprise about 0.1 to about 30 wt % of a pigment based on the weight of the first composite resin composition and the weight of the second composite resin composition, respectively. When the pigment is comprised in an amount of less than the above range in the first composite resin composition or the second composite resin composition, the decorative sheet can deteriorate in hiding and coloring properties. When the pigment is comprised in an amount of more than the above range, the composite resin can suffer from reduction in viscosity, causing processing problems.

The pigment may be comprised in any one of the layers or all the layers. However, when a pigment is employed to all of the top surface layer 110, the rear surface layer 120 and the intermediate layer 130, manufacturing costs can be increased and the appearance can deteriorate due to pigment agglomerate. In addition, when the pigment is employed only to the top surface layer 110 or the rear surface layer 120, hiding properties of the decorative sheet can deteriorate. Therefore, it is desirable that the pigment is employed only to the intermediate layer 130.

The pigment may include at least one selected from among white, black, yellow, blue, red, green pigments, and mixtures thereof.

Particularly, the white pigment may include inorganic particles, such as titanium oxide, calcium carbonate, barium sulfate, magnesium carbonate, and the like, and the black pigment may include carbon black. Further, the yellow, blue, red, and green pigments, or any commercially available materials used in the art may be used without limitation.

A decorative sheet 100 having a multi-layer structure may be manufactured through co-extrusion using T-die. The thickness of each layer may be determined by a discharge rate upon extrusion. In case of a decorative sheet 100 having a three layer structure, a feed block is disposed in front of the T-die for co-extrusion, such that the three layer structure can be manufactured using the composite resin discharged from each of two extruders. In the three layer sheet, the thickness ratio between layers may be determined by a discharge rate upon extrusion.

Further, a decorative sheet prepared by extrusion or co-extrusion may have the total thickness of about 200 μm to about 1000 μm depending upon extruder, process conditions, and the like.

The intermediate layer 130 may have a thickness of about 1 to about 20 times the thickness of the top surface layer 110. The rear layer 120 may have a thickness of about 1 to about 2 times the thickness of the top surface layer 130.

The decorative sheet 100 having the above-mentioned advantages is useful as interior decorative sheets applicable to furniture, sinks, and the like.

Figure 2:
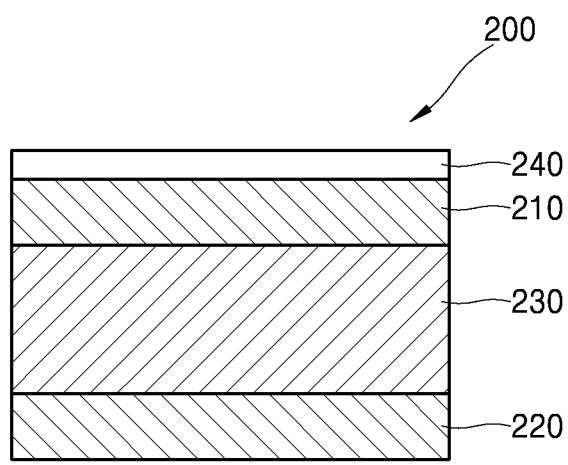
FIG. 2 is a sectional view of a decorative sheet according to another embodiment of the present invention.
Figure 3:
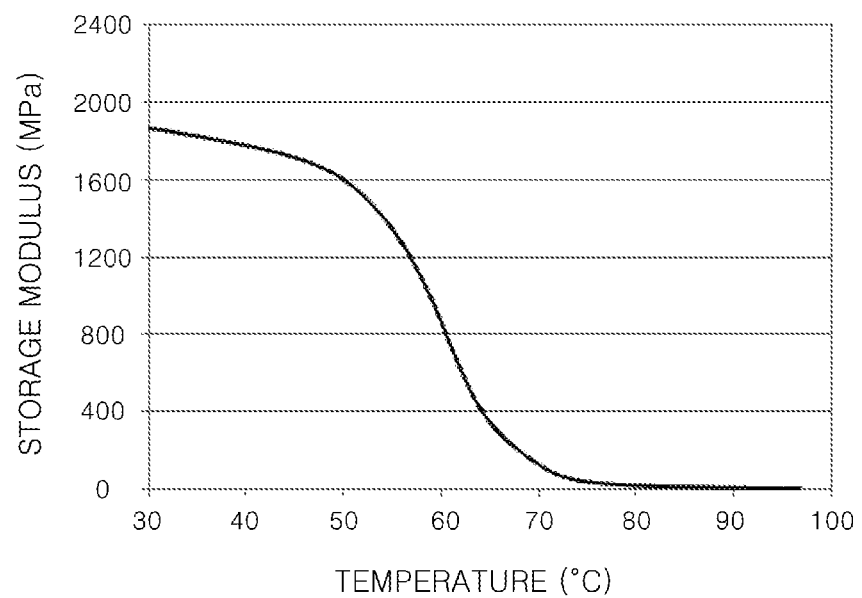
FIG. 3 is a graph showing a storage modulus on temperature of a decorative sheet of Example 1.
Figure 4:
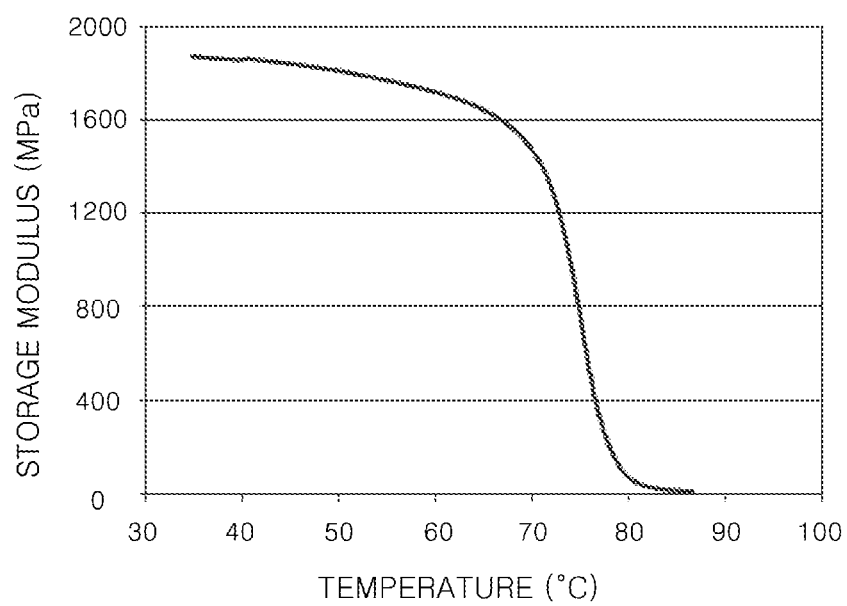
FIG. 4 is a graph showing a storage modulus on temperature of a decorative sheet of Comparative Example 1.
Figure 5:
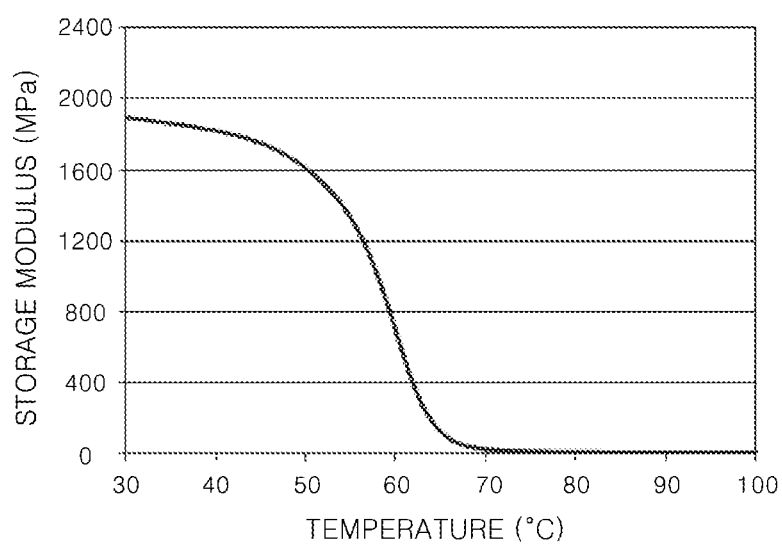
FIG. 5 is a graph showing a storage modulus on temperature of a decorative sheet of Comparative Example 2.
Figure 6:
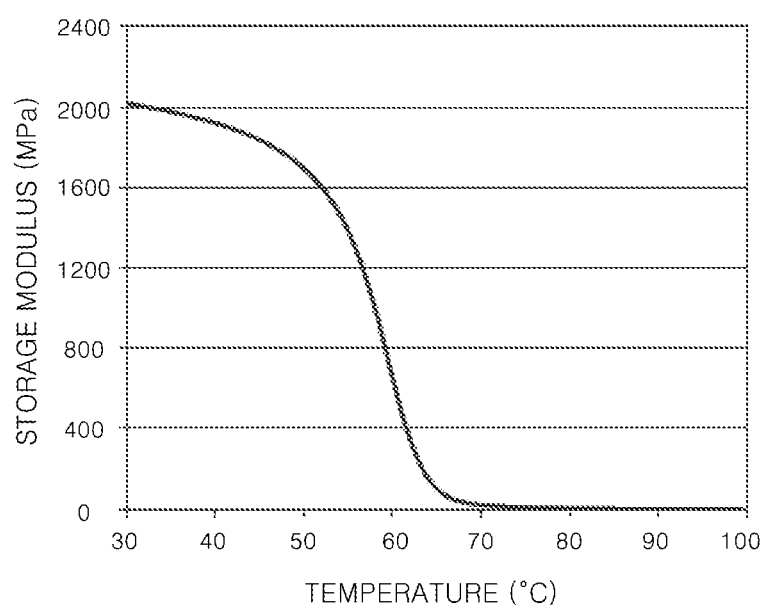
FIG. 6 is a graph showing a storage modulus on temperature of a decorative sheet of Example 2.

FIG. 2 is a schematic sectional view of a decorative sheet 200 according to one embodiment of the present invention.

The decorative sheet 200 may further comprise a hard coating layer 240 on the top surface layer 210. The hard coating layer may comprise at least one acrylic resin selected from the group consisting of methyl methacrylate, hydroxyethyl methacrylate, methacrylate, ethyl acrylate, and a combination thereof.

Hereinafter, examples of the present invention and comparative example will be described. However, it should be noted that these examples are provided for illustration only and are not to be construed in any way as limiting the present invention.

EXAMPLES

Example 1

The decorative sheet having a three layer of A/B/A structure was formed by extrusion. The layer A, which is used as a top surface layer and a rear surface layer, was formed from a composite resin prepared by adding 150 g of PBT resin to 850 g of PETG resin. The layer B, which is used as an intermediate layer, was formed from a composite resin prepared by adding 150 g of PET resin and 150 g of PBT resin to 700 g of PETG resin. The two types of composite resins were extruded to form a 0.3 mm thick sheet. Then the sheet was coated with a hard coating layer, which is formed from acrylic resin by thermal transfer.

Example 2

The decorative sheet having a three layer of A/B/A structure was formed by extrusion. The layer A, which is used as a top surface layer and a rear surface layer, was formed from a composite resin prepared by adding 150 g of PBT resin to 850 g of PETG resin. The layer B, which is used as an intermediate layer, was formed from a composite resin prepared by adding 150 g of PET resin and 70 g of PBT resin to 780 g of PETG resin. The two types of composite resins were extruded to form a 0.3 mm thick sheet. Then the sheet was coated with a hard coating layer, which is formed from acrylic resin by thermal transfer.

Example 3

The decorative sheet having a three layer of A/B/A structure was formed by extrusion. The layer A, which is used as a top surface layer and a rear surface layer, was formed from a composite resin prepared by adding 150 g of PBT resin to 850 g of PETG resin. The layer B, which is used as an intermediate layer, was formed from a composite resin prepared by adding 150 g of PET resin and 40 g of PBT resin to 810 g of PETG resin. The two types of composite resins were extruded to form a 0.3 mm thick sheet. Then the sheet was coated with a hard coating layer, which is formed from acrylic resin by thermal transfer.

Example 4

The decorative sheet having a three layer of A/B/A structure was formed by extrusion. The layer A, which is used as a top surface layer and a rear surface layer, was formed from a composite resin prepared by adding 150 g of PTT resin to 850 g of PETG resin. The layer B, which is used as an intermediate layer, was formed from a composite resin prepared by adding 150 g of PET resin and 150 g of PTT resin to 700 g of PETG resin. The two types of composite resins were extruded to form a 0.3 mm thick sheet. Then the sheet was coated with a hard coating layer, which is formed from acrylic resin by thermal transfer.

Example 5

The decorative sheet having a three layer of A/B/A structure was formed by extrusion. The layer A, which is used as a top surface layer and a rear surface layer, was formed from a composite resin prepared by adding 150 g of PBT resin to 850 g of PETG resin. The layer B, which is used as an intermediate layer, was formed from a composite resin prepared by adding 250 g of PET resin and 150 g of PBT resin to 600 g of PETG resin. The two types of composite resins were extruded to form a 0.3 mm thick sheet. Then the sheet was coated with a hard coating layer, which is formed from acrylic resin by thermal transfer.

Example 6

The decorative sheet having a three layer of A/B/A structure was formed by extrusion. The layer A, which is used as a top surface layer and a rear surface layer, was formed from a composite resin prepared by adding 150 g of PTT resin to 850 g of PETG resin. The layer B, which is used as an intermediate layer, was formed from a composite resin prepared by adding 150 g of PET resin and 20 g of PTT resin to 830 g of PETG resin. The two types of composite resins were extruded to form a 0.3 mm thick sheet. Then the sheet was coated with a hard coating layer, which is formed from acrylic resin by thermal transfer.

Comparative Example 1

1,000 g of PETG resin alone was extruded to form a 0.3 mm thick sheet. Then the sheet was coated with a hard coating layer, which is formed from acrylic resin by thermal transfer.

Comparative Example 2

150 g of PBT resin was added to 850 g of PETG resin, and the mixture was extruded to form a 0.3 mm thick sheet. Then the sheet was coated with a hard coating layer, which is formed from acrylic resin by thermal transfer.

Comparative Example 3

150 g of PET resin and 150 g of PBT resin were added to 700 g of PETG resin, and the mixture was extruded to form a 0.3 mm thick sheet. Then the sheet was coated with a hard coating layer, which is formed from acrylic resin by thermal transfer.

Comparative Example 4

1,000 g of PETG resin alone was extruded to form a 0.3 mm thick sheet.

Comparative Example 5

1,000 g of PET resin alone was extruded to form a 0.3 mm thick sheet.

Comparative Example 6

The decorative sheet having a three layer of A/B/A structure was formed by extrusion. The layer A, which is used as a top surface layer and a rear surface layer, was formed from a composite resin prepared by adding 150 g of PBT resin to 850 g of PETG resin. The layer B, which is used as an intermediate layer, was formed from a composite resin prepared by adding 400 g of PET resin and 150 g of PBT resin to 450 g of PETG resin. The two types of composite resins were extruded to form a 0.3 mm thick sheet. Then the sheet was coated with a hard coating layer, which is formed from acrylic resin by thermal transfer.

Evaluation

Test 1: Measurement of Temperature Range Causing Decrease in Elastic Modulus (Moldable Temperature)

For evaluation in the moldability of the sheets prepared in Examples 1 to 6 and Comparative Examples 1 to 6, a change in elastic modulus on temperature was measured by using DMA (dynamic mechanical analysis). The temperature range occurring decrease in elastic modulus and the glass-transition temperature are shown in Table 1 below.

Test 2: Evaluation of Moldability on Curved Surfaces

The moldability on curved surfaces was evaluated by using a vacuum molding machine according to the following steps.

Step 1: Pre-heating at 80° C. for 2 minutes
Step 2: Decompression under 2 bar for 1 minute
Step 3: Decompression under 5 bar for 2 minute
Step 4: Vacuum release/cooling The sheet was thermoformed through the above four steps and evaluated for the moldability and crack occurrence on curved surfaces by the naked eyes. The results were classified into four groups, i.e., excellent, good, moderate and poor, which are shown in Table 1 below.

Excellent: ⊚, Good: ○, Moderate: Δ, Poor: X

Test 3: Evaluation of Surface Hardness

The sheets prepared in Examples 1 to 6 and Comparative Examples 1 to 6 were evaluated for the surface hardness by pencil hardness test under 500 g of load. The results were shown in Table 1.

Test 4: Evaluation of Hard Coating Stability

After transfer of acrylic hard coating layer, the lifting and air bubble were observed with the naked eyes. The results were classified into four groups, i.e., excellent, good, moderate and poor, which are shown in Table 1 below.

Excellent: ⊚, Good: ○, Moderate: Δ, Poor: X

TABLE 1

| Items | Temperature range causing decrease in elastic modulus (° C.) | Glass transition temperature (° C.) | Moldability on curved surfaces | Surface hardness | Stability of hard coating |
|---|---|---|---|---|---|
| Example 1 | 55 to 70 | 65 | ⊚ | H | ○ |
| Example 2 | 60 to 75 | 70 | ⊚ | H | ○ |
| Example 3 | 65 to 80 | 75 | ○ | H | ○ |
| Example 4 | 55 to 70 | 65 | ⊚ | H | ○ |
| Example 5 | 55 to 70 | 65 | ○ | H | ○ |
| Example 6 | 70 to 80 | 78 | Δ | H | ○ |
| Comparative Example 1 | 70 to 82 | 80 | ○ | H | ○ |
| Comparative Example 2 | 55 to 70 | 65 | ⊚ | H | ○ |
| Comparative Example 3 | 55 to 70 | 65 | ○ | B | X |
| Comparative Example 4 | 70 to 81 | 80 | ○ | B | N/A |
| Comparative Example 5 | 70 to 91 | 80 | X | HB | X |
| Comparative Example 6 | 55 to 70 | 65 | Δ | H | ○ |

4. Results of Moldability Evaluation

FIG. 3, FIG. 4, FIG. 5 and FIG. 6 show the changes in elastic modulus on temperature of the sheets prepared in Example 1, Comparative Example 1, Comparative Example 2 and Example 5, respectively. In FIG. 3 to FIG. 6, the inflection region in curve can be determined to a moldable temperature.

With reference to Table 1, and FIG. 2 to FIG. 5, the decorative sheet prepared in Example 1 using an intermediate layer formed from a composite resin comprised of PETG, 15 wt % of PBT and 15 wt % of PET, has a temperature range causing a decrease in elastic modulus of about 80° C. or less, and a glass-transition temperature of 65° C.

In comparison with Comparative Example 2 using PETG and 15 wt % of PBT only, the glass-transition temperature and moldable temperature were not affected by using PET, which means that it enables cost-effective manufacture.

On the contrary, the sheet having a single layer of PETG in Comparative Example 1 underwent decrease in elastic modulus at a relatively higher temperature than the sheets prepared in Examples, and had a glass transition temperature of 80° C., which is about 12° C. higher than that of the sheets prepared in Examples.

However, when PET is comprised as a component of the top surface layer, the sheet may have a problem in the hard coating properties, resulting in decrease of the surface hardness. The sheets prepared in Comparative Example 3 and Comparative Example 5 comprising PET as a component of the top surface layer underwent decrease in the surface hardness and deteriorated in hard coating stability.

EXPLANATION OF SYMBOLS 100, 200: Decorative sheet
110, 210: Top surface layer
120, 220: Rear surface layer
130, 230: Intermediate layer
240: Hard coating layer

The invention claimed is:

1. A decorative sheet comprising a top surface layer, a rear surface layer and at least one intermediate layer between the top surface layer and the rear surface layer, wherein the top surface layer and the rear surface layer each independently are formed from a first composite resin composition comprising a glycol-modified polyethylene terephthalate resin, or a blend of a glycol-modified polyethylene terephthalate resin and an ester-based resin, the intermediate layer is formed from a second composite resin composition comprising a glycol-modified polyethylene terephthalate resin, a polyethylene terephthalate resin and an ester-based resin, the glass-transition temperature of the ester-based resin is lower than the glass-transition temperature of the glycol-modified polyethylene terephthalate resin; the glass-transition temperature of the ester-based resin is lower than the glass-transition temperature of the polyethylene terephthalate resin, the content of the polyethylene terephthalate resin in the second composite resin composition is 15 to 30 wt %, the content of the ester-based resin in the second composite resin composition is 5 to 20 wt %, and the ester-based resin is at least one selected from the group consisting of polybutylene terephthalate and polytrimethylene terephthalate.

2. The decorative sheet of claim 1, wherein the content of the ester-based resin in the first composite resin composition is 0 to 20 wt %.

3. The decorative sheet of claim 1, wherein the first composite resin composition and the second composite resin composition each have a glass-transition temperature of 72±10° C.

4. The decorative sheet of claim 1, wherein further comprising a pigment in at least one of the layers of the sheet.

5. The decorative sheet of claim 4, wherein the content of the pigment in the first composite resin composition or the second composite resin composition is 0.1 to 30 wt %.

6. The decorative sheet of claim 1, wherein the intermediate layer has a thickness of 1 to 20 times the thickness of the top surface layer.

7. The decorative sheet of claim 1, wherein the rear layer has a thickness of 1 to 2 times the thickness of the top surface layer.

8. The decorative sheet of claim 1, wherein the decorative sheet has the total thickness of 200 μm to 1000 μm.

9. The decorative sheet of claim 1, wherein the decorative sheet has a moldable temperature of 55° C. to 80° C.

10. The decorative sheet of claim 1, wherein further comprising a hard coating layer on the top surface layer.

11. The decorative sheet of claim 10, wherein the hard coating layer comprises at least one selected from the group consisting of methyl methacrylate, hydroxyethyl methacrylate, methacrylate, ethyl acrylate, and a combination thereof.

* * * * *